United States Patent
Camp et al.

(10) Patent No.: US 9,727,244 B2
(45) Date of Patent: Aug. 8, 2017

(54) EXPANDING EFFECTIVE STORAGE CAPACITY OF A DATA STORAGE SYSTEM WHILE PROVIDING SUPPORT FOR ADDRESS MAPPING RECOVERY

(71) Applicant: INTERNATIONAL BUSINESS MACHINES CORPORATION, Armonk, NY (US)

(72) Inventors: Charles J. Camp, Sugar Land, TX (US); Jan M. Janick, Cary, NC (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 14/874,655

(22) Filed: Oct. 5, 2015

(65) Prior Publication Data
US 2017/0097773 A1    Apr. 6, 2017

(51) Int. Cl.
G06F 12/10         (2016.01)
G06F 3/06          (2006.01)
G06F 12/1009       (2016.01)

(52) U.S. Cl.
CPC .......... *G06F 3/0604* (2013.01); *G06F 3/0653* (2013.01); *G06F 3/0659* (2013.01); *G06F 3/0685* (2013.01); *G06F 12/1009* (2013.01); *G06F 2212/1032* (2013.01); *G06F 2212/2022* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 7,076,606 B2 | 7/2006 | Orsley | |
| 7,987,162 B2 | 7/2011 | Aston et al. | |
| 8,326,884 B2 | 12/2012 | Jurneke | |
| 8,612,699 B2 | 12/2013 | Jain et al. | |

(Continued)

FOREIGN PATENT DOCUMENTS

EP    795965 A2    9/1997

OTHER PUBLICATIONS

Debra A. Lelewer et al., "Data Compression", ACM, 1987.

*Primary Examiner* — John A Lane
(74) *Attorney, Agent, or Firm* — Brian F. Russell; Randall J. Bluestone

(57) ABSTRACT

In response to receipt of a write input-output operation (IOP) including a logical address and a logical page of write data, control logic of a data storage system detects a presence of a data pattern in the logical page. In response to detecting the presence of the data pattern in the logical page of write data, the control logic records, in a logical-to-physical translation data structure, an association between the logical address and a data pattern identifier identifying the detected data pattern in the bulk storage media, refrains from writing the logical page of write data to the bulk storage media, and writes logical page metadata describing the logical page of write data to the bulk storage media. The logical page metadata includes at least the logical address and the data pattern identifier, such that contents of the logical-to-physical translation data structure can be recovered from the bulk storage media.

19 Claims, 7 Drawing Sheets

(56) References Cited

U.S. PATENT DOCUMENTS

| | | | |
|---|---|---|---|
| 2005/0025232 A1* | 2/2005 | Parida | H03M 7/30 375/240 |
| 2013/0246689 A1* | 9/2013 | Matsudaira | G06F 12/0246 711/103 |
| 2014/0244935 A1 | 8/2014 | Ezra et al. | |
| 2014/0281247 A1 | 9/2014 | Loaiza et al. | |

\* cited by examiner

EXPANDING EFFECTIVE STORAGE
CAPACITY OF A DATA STORAGE SYSTEM
WHILE PROVIDING SUPPORT FOR
ADDRESS MAPPING RECOVERY

BACKGROUND OF THE INVENTION

This disclosure relates to data processing and storage, and more specifically, to data storage systems, such as flash-based data storage systems, that employ techniques to expand the effective storage capacity of the data storage systems while providing support for recovery of address mapping information.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

Data storage systems, including those employing NAND flash media, commonly employ either hardware-based or software-based techniques, such as data compression and deduplication, to increase the effective storage capacity of a given storage system. The present disclosure appreciates that some prior art techniques of increasing the effective storage capacity of a data storage system make recovery difficult in the presence of certain types of failures, such as corruption of logical-to-physical address mappings.

BRIEF SUMMARY

In at least one embodiment, in response to receipt of a write input-output operation (IOP) including a logical address and a logical page of write data, control logic of a data storage system detects a presence of a data pattern in the logical page. In response to detecting the presence of the data pattern in the logical page of write data, the control logic records, in a logical-to-physical translation data structure, an association between the logical address and a data pattern identifier identifying the detected data pattern in the bulk storage media, refrains from writing the logical page of write data to the bulk storage media, and writes logical page metadata describing the logical page of write data to the bulk storage media. The logical page metadata includes at least the logical address and the data pattern identifier, such that contents of the logical-to-physical translation data structure can be recovered from the bulk storage media.

BRIEF DESCRIPTION OF THE SEVERAL
VIEWS OF THE DRAWINGS

Figure 5:
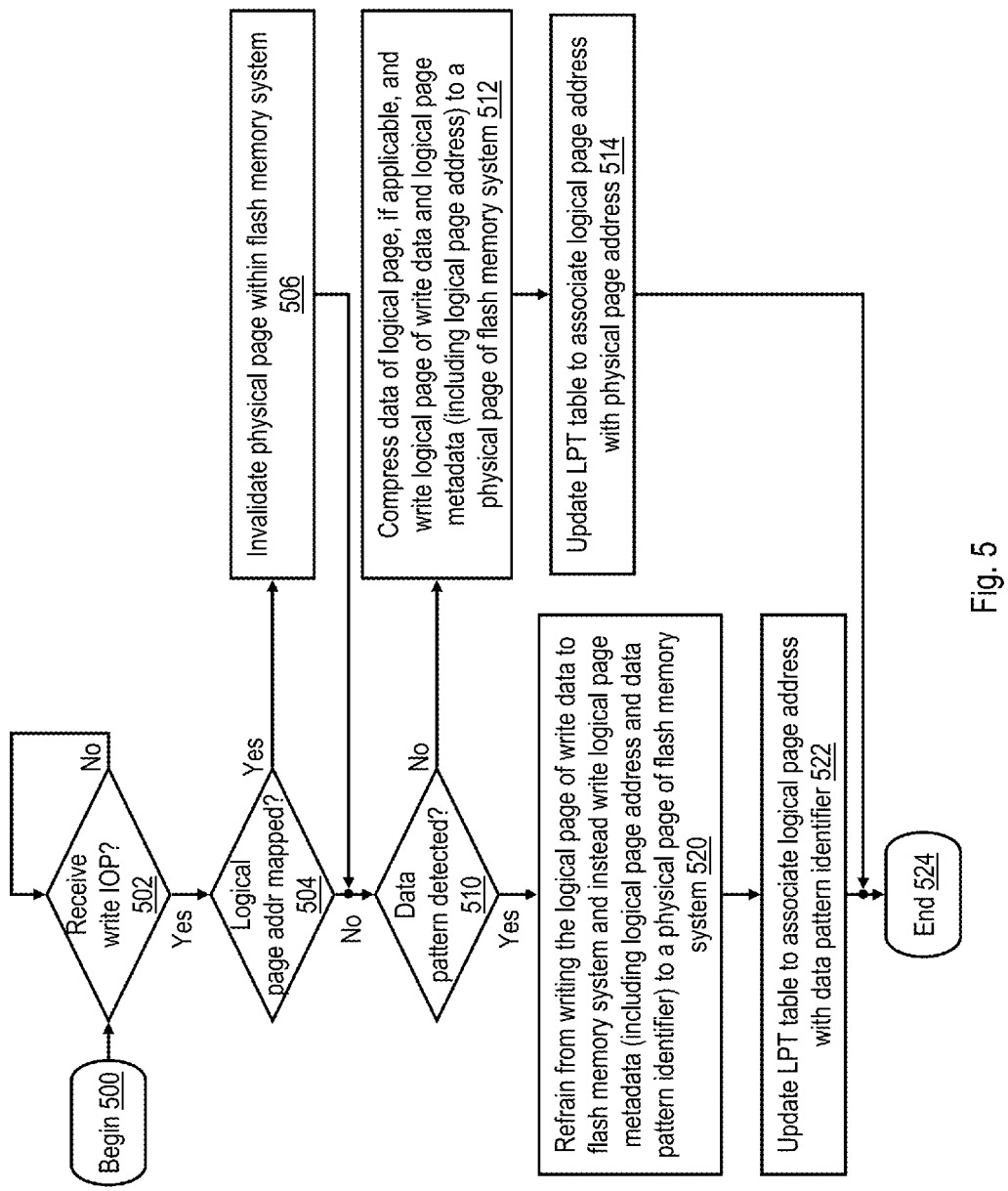
Figure 6:
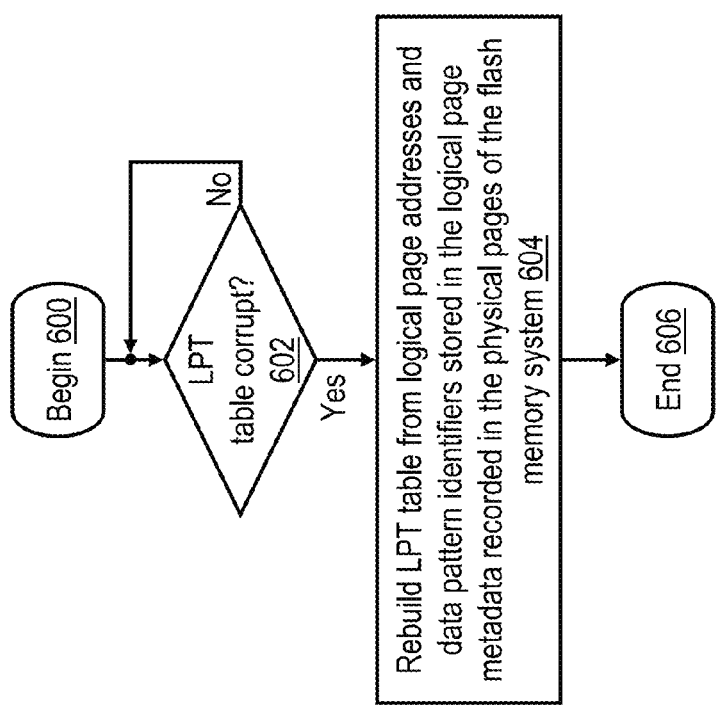

FIG. 5 is a high level logical flowchart of an exemplary process for increasing the effective storage capacity of a data storage system, such as a flash memory system, through the use of data compression and data deduplication in accordance with one embodiment; and FIG. 6 is a high level logical flowchart of an exemplary process for recovering a logical-to-physical translation (LPT) table in accordance with one embodiment.

DETAILED DESCRIPTION

Figure 1A:
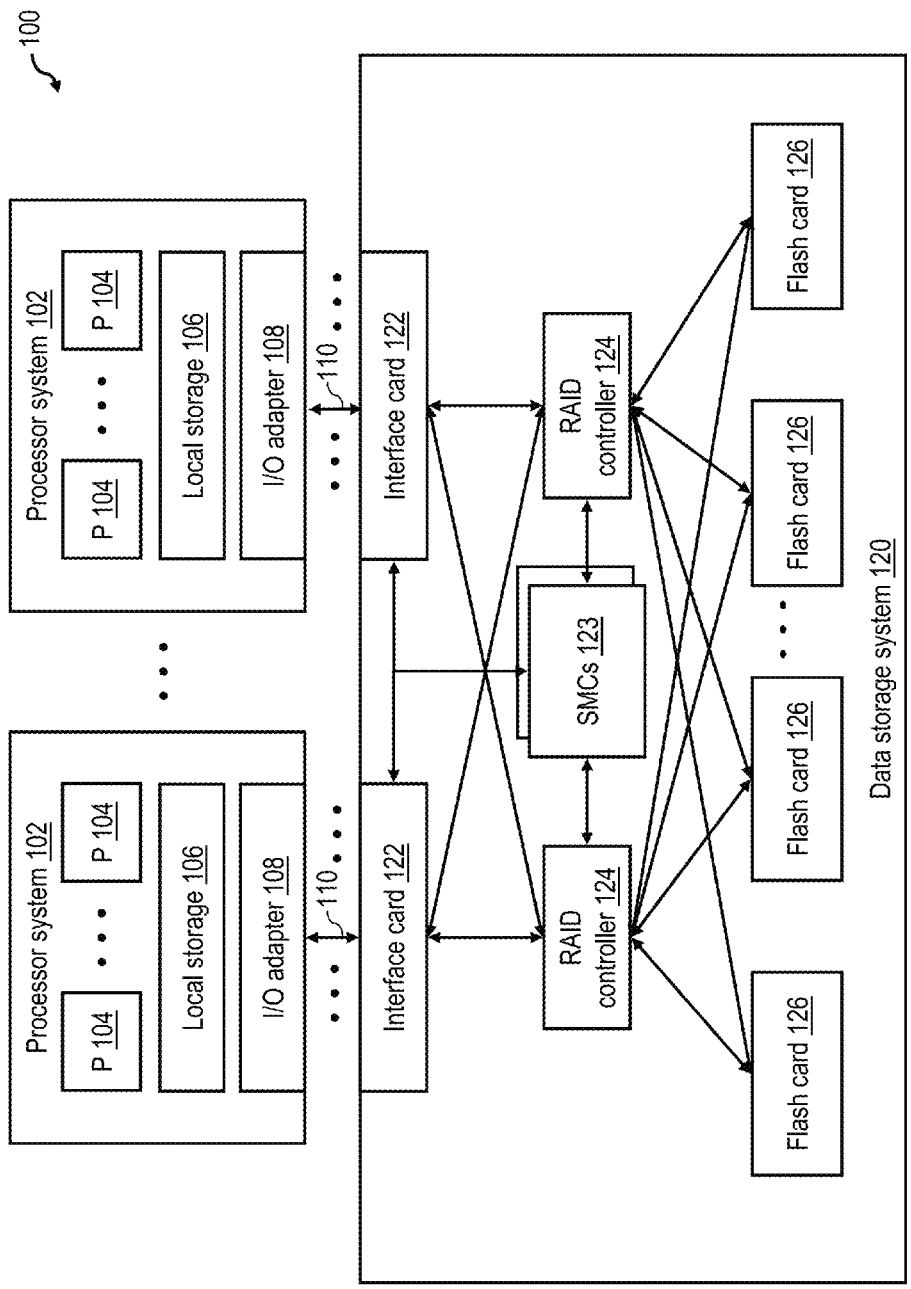
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

Although not required, in the illustrated embodiment, data storage system 120 includes multiple interface cards 122 through which data storage system 120 receives and responds to input/output operations (IOP) of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, alternative and/or additional non-volatile bulk storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
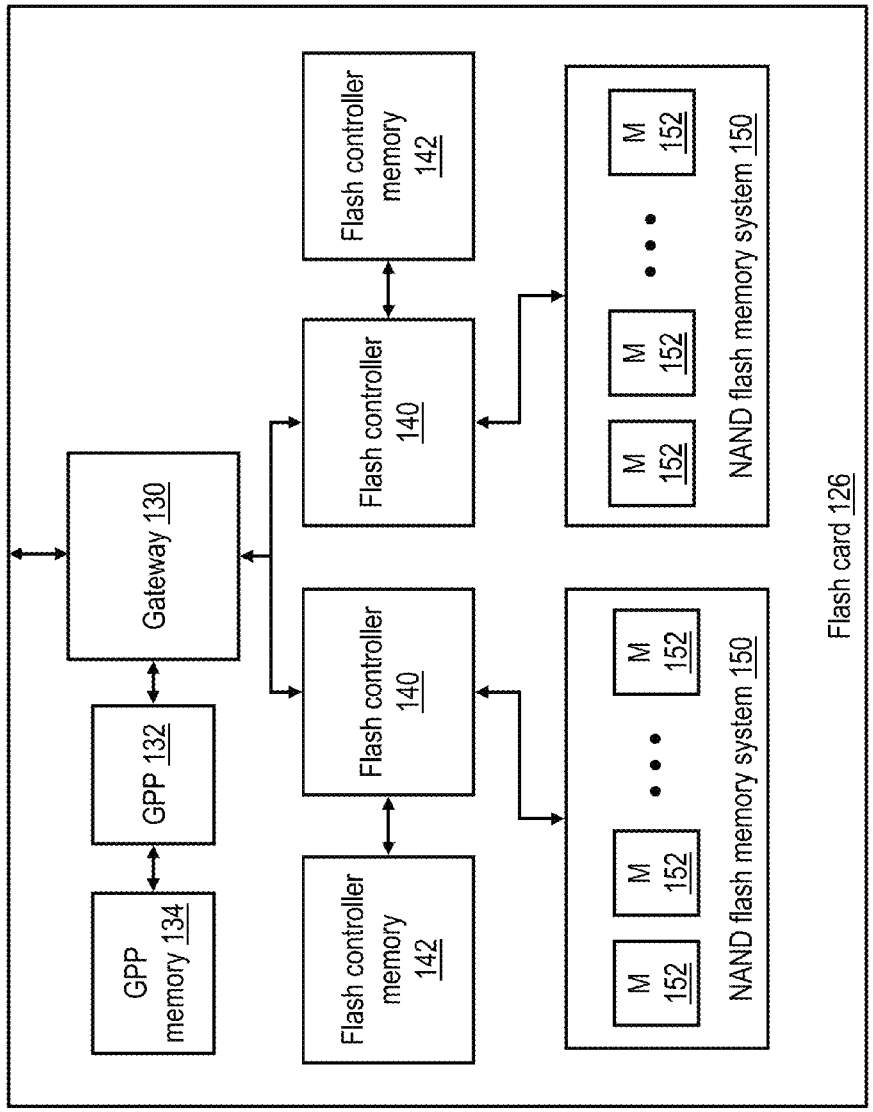
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. The flash translation layer translates LBAs received from a RAID controller 124 into physical addresses assigned to corresponding physical locations in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142, as will hereafter be assumed.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of board-mounted flash memory modules, for example, Single Level Cell (SLC), Multi-Level Cell (MLC), Three Level Cell (TLC), or Quad Level Cell (QLC) NAND flash memory modules.

Figure 2:
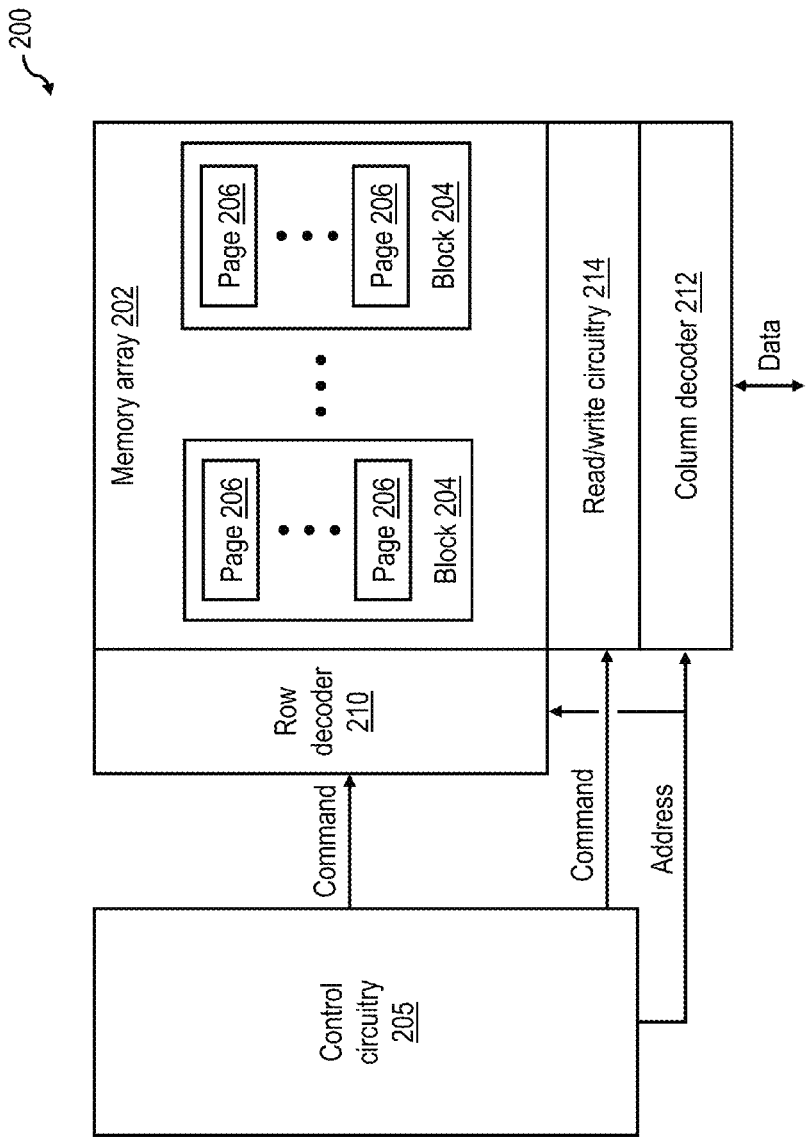
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two- or three-dimensional array of NAND flash memory cells. As indicated in FIG. 2, the memory cells within memory array 202 are physically arranged in multiple blocks 204, each in turn including multiple physical pages 206.

As is known to those skilled in the art, NAND flash memory, such as that employed in memory array 202, must be erased prior to being programmed. Further, NAND flash memory is generally constrained by its construction such that the smallest granule of storage that can be erased is a block 204 and the smallest granule of storage that can be accessed by a read or write IOP is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus correspond to multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from LBAs within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life).

In response to write IOP received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write IOP and any non-updated data (i.e., for write requests smaller than a logical page, the remaining valid data from a previous write to the same logical address which is not being overwritten and which must be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data. Data placement function 310 then writes the write data, associated metadata, and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read IOPs by reference to LPT table 300 as further illustrated in FIG. 3.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the blocks 204 within the block stripes and how much of the data within the erase blocks 204 is invalid. In the illustrated example, garbage collection is performed on entire block stripes, and flash management code running on GPP 132 logs the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 updates LPT table 300 to remove the current association between the logical and physical addresses of the data. In addition, relocation function 314 issues relocation write requests to data placement function 310 to request that the valid data of the old block stripe be written to a new block stripe in NAND flash memory system 150. Once all remaining valid data has been moved from the old block stripe, the old block stripe is passed to dissolve block stripes function 316, which decomposes the old block stripe into its constituent blocks 204, thus disassociating the blocks 204. Each of the blocks 204 formerly forming the dissolved block stripe is then erased under the direction of flash controller 140 and/or the control circuitry 205 of the relevant flash memory module 200, and a corresponding program/erase (P/E) cycle count for each erased block is incremented. Based on the health metrics of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
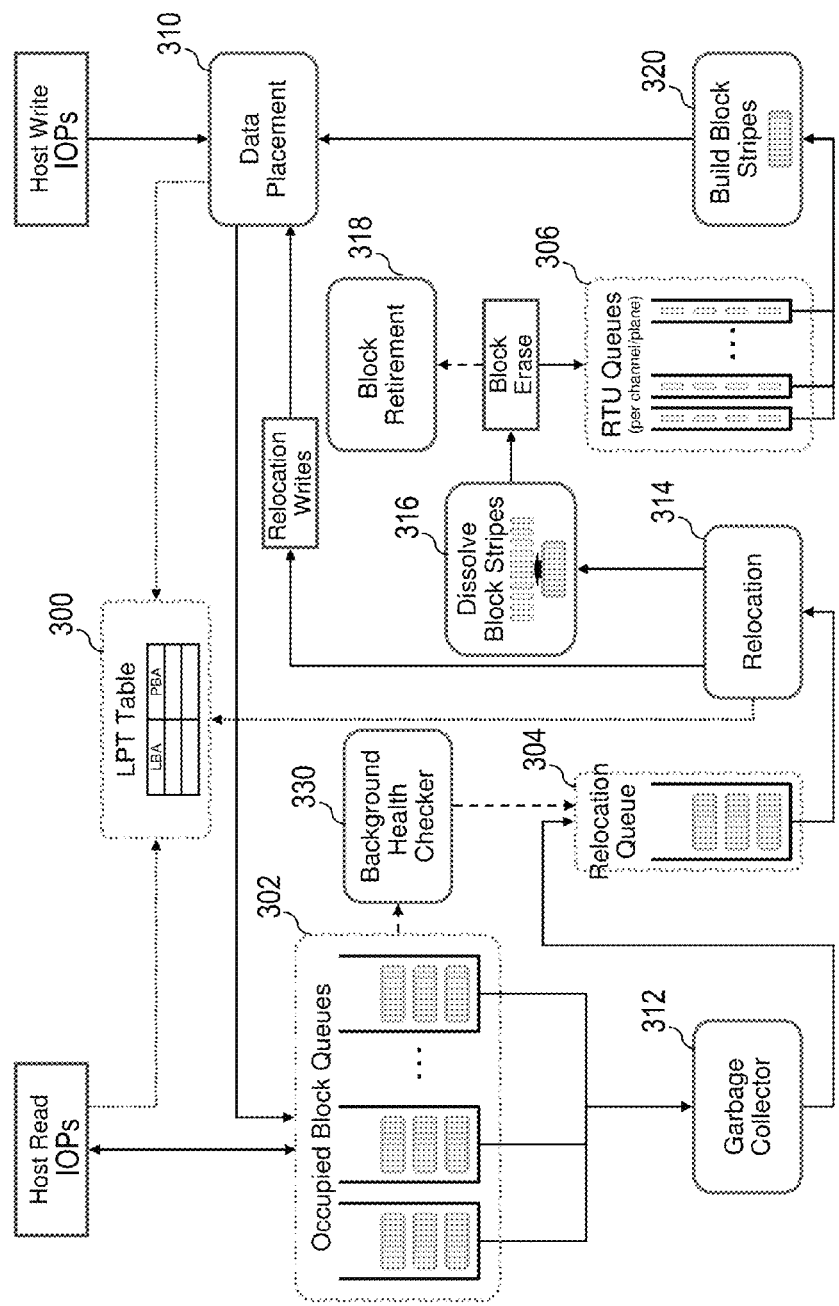
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write IOPs of hosts such as processor systems 102, continuously determines one or more metrics of health for blocks belonging to block stripes recorded in occupied block queues 302. Based on the one or more of the health metrics, background health checker 330 places block stripes on relocation queue 304 for handling by relocation function 314. Key health metrics preferably monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, health can be determined from an analysis of valid and invalid data, thereby ensuring that blocks containing almost entirely invalid data are fully analyzed to determine overall block health.

In accordance with one aspect of the present disclosure, control logic of a NAND flash-based data storage system, such as data storage system 120 of FIG. 1A, employs one or more techniques, such as data compression and data deduplication, in order to provide increased effective storage capacity within data storage system 120 while still supporting recovery from faults, such as corruption of LPT table 300. In various embodiments, control logic that performs such functions may be implemented in hardware (i.e., integrated circuitry), which in some embodiments can be programmable, and/or through the execution of firmware and/or software. Further, the control logic can reside at and/or be distributed among a system level (e.g., in system management controllers 123), an intermediate level (e.g., in RAID controllers 124) and lower level (e.g., within flash cards 126).

Figure 4:
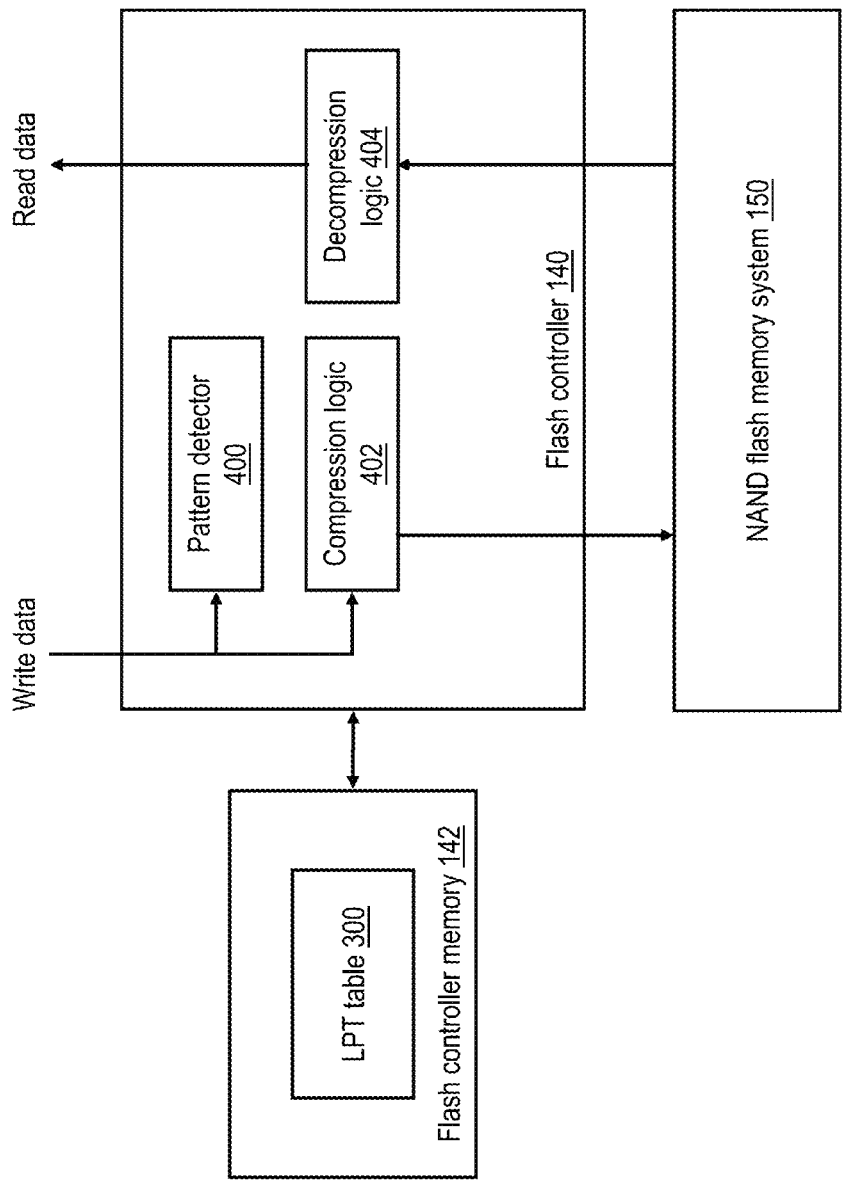
FIG. 4 is a more detailed view of control logic, such as a flash controller, which employs one or more techniques, such as data compression and data deduplication, to increase the effective storage capacity of a flash memory system.

Referring now to FIG. 4, there is depicted a more detailed view of control logic that employs one or more techniques, such as data compression and data deduplication, to increase the effective storage capacity of a flash memory system. In the embodiment illustrated in FIG. 4, this control logic is implemented within flash controller 140 utilizing hardware and/or program code (i.e., firmware and/or software).

As illustrated, flash controller 140 includes a pattern detector 400, which implements data deduplication by analyzing incoming write data for the occurrence of repetitive data patterns and by writing a pattern identifier of any recognized pattern to LPT table 300 (which can conveniently be implemented in flash controller memory 142) in lieu of writing the write data to the associated NAND flash memory system 150. Flash controller 140 additionally includes compression logic 402, which implements one or more data compression techniques to reduce the size of at least some write data written to NAND flash memory system 150. Compression logic 402 can be employed, for example, as part of data placement function 310 depicted in FIG. 3. Flash controller 140 further includes decompression logic 404, which is utilized, if necessary, to decompress data read from NAND flash memory system 150 in response to read IOPs.

With reference now to FIG. 5, a high level logical flowchart of an exemplary process for increasing the effective storage capacity of a data system through the use of data compression and data deduplication in accordance with one embodiment is depicted. The illustrated process can be performed, for example, by control logic of a NAND flash memory system 150, such as the flash controller 140 of FIG. 4. In other embodiments, the process can be performed by other control logic, such as GPP 132.

The process begins at block 500 and proceeds to block 502, which illustrates flash controller 140 awaiting receipt of a write IOP from a host system, such as a processor system 102. A write IOP typically includes at least a logical address of a logical page to be written and the write data of the logical page. In response to a determination at block 502 that a write IOP has been received, the process proceeds to block 504, which illustrates flash controller 140 performing a lookup of the logical address in LPT table 300 to determine whether or not the logical page address of the logical page is currently mapped to a physical address of a physical page in the associated NAND flash memory system 150. If not, the process proceeds to block 510, which is described below. In response to a determination at block 504 that the logical page address specified by the write IOP is currently mapped by LPT table 300, flash controller 140 invalidates the associated physical page in NAND flash memory system 150, for example, by resetting a valid field in LPT table 300 and/or in the physical page (block 506). The process then passes from block 506 to block 510.

Block 510 illustrates flash controller 140 (e.g., pattern detector 400 of flash controller 140) detecting whether or not the logical page of write data received in the write IOP contains a common data pattern, such as all zeros, all ones, or some other common data pattern. If so, flash controller 140 performs data deduplication at blocks 520-522, which are described below. If, however, flash controller 140 does not detect that the logical page of write data contains a common data pattern, the process instead passes to blocks 512-514, which illustrate flash controller 140 implementing data compression.

Referring now to block 512, flash controller 140 (e.g., compression logic 402 of flash controller 140) applies one or more selected data compression algorithms to the logical page of write data to obtain a compressed logical page. In at least some embodiments, the application of data compression, the data compression technique(s), and/or amount of data compression applied to the logical page of write data by compression logic 402 can be selectable, based, for example, on the write access frequency (i.e., "heat") of the logical address, the compressibility of the write data, and/or the current workload of flash controller 140, etc. After application of data compression, if any, to the logical page by flash controller 140, flash controller 140 writes the logical page of write data (as compressed, if applicable) to a selected physical page in NAND flash memory system 150 and marks the selected physical page as valid (e.g., by setting a valid field of the physical page). As further illustrated at block 512, flash controller 140 additionally writes logical page metadata regarding the logical page to the physical page. The logical page metadata includes at least the logical page address of the write data and may further include other metadata, such as error detection and/or error correction information (e.g., cyclic redundancy code (CRC) and error correcting code (ECC) values), a unique (e.g., monotonically increasing) sequence number indicating an ordering of the write IOP relative to other IOPs received by flash controller 140, start-of-page and end-of-page identifiers, etc. As discussed further below with reference to FIG. 6, the logical page address stored in the physical page can be utilized to recover the contents of LPT table 300 in the event that LPT 300 is corrupted.

As further illustrated at block 514, flash controller 140 also updates LPT table 300 to associate the logical address of the logical page of write data with the physical address of the physical page allocated to store the logical page and associated logical page metadata. In updating LPT table 300, flash controller 140 disassociates the logical page address from any other physical page to which the logical page address was previously mapped (as discussed above with reference to block 504). Following block 514, the process of FIG. 5 ends at block 524 until flash controller 140 receives a subsequent write IOP.

Referring now to block 520, if flash controller 140 detects that the logical page of write data contains a common data pattern, flash controller 140 refrains from writing the logical page of write data to NAND flash memory system 150. Instead, flash controller 140 writes logical page metadata to a selected physical page in NAND flash memory system 150 and marks the selected physical page as valid. As depicted at block 520, in this case the logical page metadata includes, for example, the logical page address of the write data, a sequence number indicating an ordering of the write IOP relative to other IOPs received by flash controller 140, and a data pattern identifier identifying the data pattern detected in the logical page. As discussed further below with reference to FIG. 6, the data pattern identifier stored in the physical page can be utilized to recover the contents of LPT table 300 in the event that LPT 300 is corrupted.

At block 522, flash controller 140 also updates LPT table 300 to associate the logical page address of the logical page of write data with the data pattern identifier of the detected data pattern in the write data. In updating LPT table 300, flash controller 140 disassociates the logical page address with any other physical page to which the logical page address was previously mapped (as discussed above with reference to block 504). In response to a subsequent read IOP specifying the logical page address, flash controller 140 will read the data pattern identifier from LPT table 300 and reproduce the requested logical page without the need to access NAND flash memory system 150. Following block 522, the process of FIG. 5 ends at block 524 until flash controller 140 receives a subsequent write IOP.

Referring now to FIG. 6, a high level logical flowchart of an exemplary process for recovering a LPT table, such as LPT table 300, in accordance with one embodiment is depicted. The process begins at block 600 and then proceeds to block 602, which illustrates the process iterating until flash controller 140 detects corruption of LPT table 300. Flash controller 140 can detect corruption of LPT table 300 in a variety of ways, including detecting receipt of a notification of interruption of power to flash controller memory 142 (which may be implemented in a volatile storage technology, such as DRAM). Corruption of LPT table 300 can also be detected utilizing one or more conventional error detection techniques, such as parity, ECC, etc.

In response to detection of LPT table 300, flash controller 140 rebuilds some or all of LPT table 300 from the logical page addresses and data pattern identifiers stored in the logical page metadata recorded in the physical pages of NAND flash memory system 150 (block 604). For example, in one embodiment, flash controller 140 sequentially reads each valid physical page in the associated NAND flash memory system 150. For each valid physical page storing a compressed or uncompressed logical page of write data, flash controller 140 makes an entry in LPT table 300 associating the logical page address contained in the logical page metadata of that physical page with the physical page's address. For each physical page storing only logical page metadata (and not the logical page data itself), flash controller 140 makes an entry in LPT table 300 associating the logical page address with the data pattern identifier contained in the logical page metadata of the physical page. In this manner, a flash controller 140 can readily recover the entire contents of LPT table 300 if corruption is detected. Following block 604, the recovery process of FIG. 6 ends at block 606.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, In response to receipt of a write input-output operation (IOP) including a logical address and a logical page of write data, control logic of a data storage system detects a presence of a data pattern in the logical page. In response to detecting the presence of the data pattern in the logical page of write data, the control logic records, in a logical-to-physical translation data structure, an association between the logical address and a data pattern identifier identifying the detected data pattern in the bulk storage media, refrains from writing the logical page of write data to the bulk storage media, and writes logical page metadata describing the logical page of write data to the bulk storage media. The logical page metadata includes at least the logical address and the data pattern identifier, such that contents of the logical-to-physical translation data structure can be recovered from the bulk storage media.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including bulk storage media, the method comprising:

in response to receipt of a write input-output operation (IOP), the write IOP including a logical address and a logical page of write data, control logic of the data storage system detecting a presence of a data pattern in the logical page of write data;

in response to detecting the presence of the data pattern in the logical page of write data, the control logic:

recording, in a logical-to-physical translation data structure, an association between the logical address and a data pattern identifier identifying the detected data pattern in the bulk storage media;

refraining from writing the logical page of write data to the bulk storage media; and writing logical page metadata describing the logical page of write data to the bulk storage media, wherein the logical page metadata includes at least the logical address and the data pattern identifier, such that contents of the logical-to-physical translation data structure can be recovered from the bulk storage media.

2. The method of claim 1, and further comprising:

in response to failing to detect the presence of the data pattern in the logical page of write data, the control logic:

recording, in the logical-to-physical translation data structure, an association between the logical address and a physical address in the bulk storage media;

writing, to the bulk storage media at the physical address, the logical page of write data and logical page metadata describing the logical page of write data, wherein the logical page metadata includes at least the logical address.

3. The method of claim 2, and further comprising compressing the logical page of write data prior to writing the logical page of write data to the bulk storage media.

4. The method of claim 1, and further comprising recovering the logical-to-physical data structure from the logical page metadata in the bulk storage media.

5. The method of claim 1, wherein:
the bulk storage media comprises NAND flash memory including a plurality of physical pages; and
writing the logical page metadata comprises writing the logical page metadata to one of the plurality of physical pages of the NAND flash memory.

6. The method of claim 1, and further comprising maintaining the logical-to-physical translation data structure in a memory separate from the bulk storage media.

7. A data storage system, comprising:
control logic configured to be coupled to non-volatile bulk storage media, wherein the control logic is configured to perform:
responsive to receipt of a write input-output operation (IOP), the write IOP including a logical address and a logical page of write data, detecting a presence of a data pattern in the logical page of write data;
responsive to detecting the presence of the data pattern in the logical page of write data:
recording, in a logical-to-physical translation data structure, an association between the logical address and a data pattern identifier identifying the detected data pattern in the bulk storage media;
refraining from writing the logical page of write data to the bulk storage media; and
writing logical page metadata describing the logical page of write data to the bulk storage media, wherein the logical page metadata includes at least the logical address and the data pattern identifier, such that contents of the logical-to-physical translation data structure can be recovered from the bulk storage media.

8. The data storage system of claim 7, wherein the control logic is further configured to perform:
responsive to failing to detect the presence of the data pattern in the logical page of write data:
recording, in the logical-to-physical translation data structure, an association between the logical address and a physical address in the bulk storage media;
writing, to the bulk storage media at the physical address, the logical page of write data and logical page metadata describing the logical page of write data, wherein the logical page metadata includes at least the logical address.

9. The data storage system of claim 8, wherein the control logic is further configured to perform:
compressing the logical page of write data prior to writing the logical page of write data to the bulk storage media.

10. The data storage system of claim 7, wherein the control logic is further configured to perform:
recovering the logical-to-physical data structure from the logical page metadata in the bulk storage media.

11. The data storage system of claim 7, wherein:
the bulk storage media comprises NAND flash memory including a plurality of physical pages; and
the control logic writes the logical page metadata to one of the plurality of physical pages of the NAND flash memory.

12. The data storage system of claim 7, wherein the control logic is further configured to perform:
maintaining the logical-to-physical translation data structure in a memory separate from the bulk storage media.

13. The data storage system of claim 7, and further comprising the non-volatile bulk storage media coupled to the control logic.

14. A program product, comprising:
a storage device; and
program code stored in the storage device, wherein the program code, when executed by a control logic, causes the control logic to perform:
responsive to receipt of a write input-output operation (IOP), the write IOP including a logical address and a logical page of write data, detecting a presence of a data pattern in the logical page of write data;
responsive to detecting the presence of the data pattern in the logical page of write data:
recording, in a logical-to-physical translation data structure, an association between the logical address and a data pattern identifier identifying the detected data pattern in the bulk storage media;
refraining from writing the logical page of write data to the bulk storage media; and
writing logical page metadata describing the logical page of write data to the bulk storage media, wherein the logical page metadata includes at least the logical address and the data pattern identifier, such that contents of the logical-to-physical translation data structure can be recovered from the bulk storage media.

15. The program product of claim 14, wherein the program code further causes the control logic to perform:
responsive to failing to detect the presence of the data pattern in the logical page of write data:
recording, in the logical-to-physical translation data structure, an association between the logical address and a physical address in the bulk storage media;
writing, to the bulk storage media at the physical address, the logical page of write data and logical page metadata describing the logical page of write data, wherein the logical page metadata includes at least the logical address.

16. The program product of claim 15, wherein the program code further causes the control logic to perform:
compressing the logical page of write data prior to writing the logical page of write data to the bulk storage media.

17. The program product of claim 14, wherein the program code further causes the control logic to perform:
recovering the logical-to-physical data structure from the logical page metadata in the bulk storage media.

18. The program product of claim 14, wherein:
the bulk storage media comprises NAND flash memory including a plurality of physical pages; and
the control logic writes the logical page metadata to one of the plurality of physical pages of the NAND flash memory.

19. The program product of claim 14, wherein the program code further causes the control logic to perform:
maintaining the logical-to-physical translation data structure in a memory separate from the bulk storage media.

* * * * *